United States Patent [19]

Josis

[11] 4,150,957

[45] Apr. 24, 1979

[54] METHOD OF CONTACTING LIQUID AND GASEOUS PHASES

[75] Inventor: Christian R. Josis, Gembloux, Belgium

[73] Assignee: Centre de Recherches Metallurgiques Centrum Voor Research in de Metallurgie, Brussels, Belgium

[21] Appl. No.: 696,181

[22] Filed: Jun. 15, 1976

[30] Foreign Application Priority Data

Jun. 24, 1975 [BE] Belgium ................................. 830596

[51] Int. Cl.$^2$ ............................................. B01D 19/00
[52] U.S. Cl. .......................................... 55/53; 55/91; 55/96
[58] Field of Search ...................... 55/52–54, 55/96, 186, 196, 282, 290, DIG. 25, 90–92, 95, 230, 233, 247; 261/80, 89, 113, 81

[56] References Cited

U.S. PATENT DOCUMENTS

| | | | |
|---|---|---|---|
| 2,894,050 | 7/1959 | Stiles | 55/DIG. 25 |
| 3,038,708 | 6/1962 | Rice | 261/80 X |
| 3,744,772 | 7/1973 | Wagner et al. | 261/80 |
| 3,834,132 | 9/1974 | Moser et al. | 261/80 X |
| 3,855,368 | 12/1974 | Prochazka et al. | 261/81 |
| 3,884,651 | 5/1975 | Velegol | 55/95 |
| 3,972,693 | 8/1976 | Wiesner et al. | 55/70 X |

Primary Examiner—Charles N. Hart
Assistant Examiner—Richard W. Burks
Attorney, Agent, or Firm—Holman & Stern

[57] ABSTRACT

Liquid and gaseous phases are contacted in a column having a plurality of perforated plates spaced one above another. Each plate undergoes rotational or translational movement while at least one of its faces is subjected to a cleaning operation.

11 Claims, 2 Drawing Figures

(1)

(2)

(3)

(1)

(2)

(3)

METHOD OF CONTACTING LIQUID AND GASEOUS PHASES

The present invention relates to a method of contacting liquid and gaseous phases.

The method according to the invention is described below with reference to a particular case of purification of waste water from a coke plant, but it is to be understood that this is only an example. Indeed such a method can be used in most cases where a liquid phase is to be purified from volatile compounds dissolved, either freely or as a salt, in the liquid, or from solids suspended in the liquid.

In various industrial operations such as distillation, absorption, aeration, degassing, cooling, and heating, liquid and gaseous phases are placed in direct contact with one another, e.g. for purification or for treatment of one phase by the other. During these operations, precipitates, encrustations, deposits, flocculations, etc. are often produced, which rapidly lead to obstruction or blockage and at least result in reduction of efficiency of the operation.

These disadvantages are particularly troublesome when dealing with a continuous operation, since in that case progressive obstruction sooner or later leads to interruption of the operation being carried out and all blocked parts must be cleaned to allow the phases to come into contact and to flow again. Such a maintenance operation is expensive and results in a serious drop in the productivity of the operation being carried out.

In the case, by way of example, where one is dealing with an installation for purifying waste water from a coke plant, volatile compounds such as $NH_3$, HCN, and $H_2S$ are removed from the waste water either by distillation or by supplying live steam (this latter operation being termed "stripping"). Owing to this distillation or stripping operation, completed by lime treatment, one also removes ammonia (present in the form of ammoniacal salts), so that purified water is completely free of ammonia-based materials.

Such an operation is conventionally performed by means of a distillation or stripping column comprising a vertical vessel in which a plurality of fixed horizontal plates are arranged one above the other and at a distance from each other, the plates being perforated. Each perforation is usually disposed below a part-spherical cap. In the column the waste water, together with milk of lime, follows a descending path, possibly a zigzag path, in the course of which they are subjected to the action of the gaseous phase passing upwards in counterflow.

As already mentioned above, such an installation rapidly becomes obstructed. Blockage of the plates results in frequent interruption of the operation of the column owing to the need for the plates to be cleaned in order to remove lime salts and hydroxides which have been deposited.

The present invention provides a method of contacting liquid and gaseous phases in a column having a plurality of perforated plates spaced one above another, in which each plate undergoes rotational or translational movement while at least one of its faces is subjected to a cleaning operation.

In a preferred method, a gaseous phase withdrawn from the column is passed through a filter or de-mixer preferably comprising a layer of suitable thickness consisting of a woven stainless steel mat which is arranged to remove any suspended liquid drops. This operation has the advantage of being able to be performed with practically no loss of pressure due to friction.

It is preferable for each plate to be part of a perforated belt, of a resilently deformable material such as rubber, and for the plates to be connected one to another so as to form a continuous perforated belt which is subjected within the column to a displacement movement along an endless path along which each portion of the belt is successively moved to different levels, where it is substantially horizontal and consitutes one said plate.

Preferably, the perforated belt is endless. In this way, it is always possible to provide a portion of belt at each desired level of the column, which allows uniform and continuous operation of the column.

While the deformable belt is being displaced it may be locally subjected to traction (whose intensity is modified in a suitable manner as a function of time), which facilitates detachment of encrustations.

Alternatively, the various plates are all subjected to a rotational movement about their symmetry axis, the rotational movement being either continuous or stepwise.

Accordingly, line deposits on the plates are substantially and continuously resisted. Moreover, continuous cleaning (such as by brushing) of the plates (or of the perforated belt) results in permanent cleanliness, and thus uniform operation of the whole installation with no interruptions.

Another advantage of this method is that perforated metal plates can be easily covered with a thin layer of polytetrafluorethylene or any other material which protects the plates against corrosion.

Moreover, while being displaced, the perforated belt may be locally subjected to traction whose intensity is modified in a suitable manner as a function of time, which leads to incrustations being detached.

The accompanying schematic drawings, given by way of non-limiting example and not to scale, illustrate an apparatus for carrying out the above described method according to the invention. In the drawings.

Figure 1:
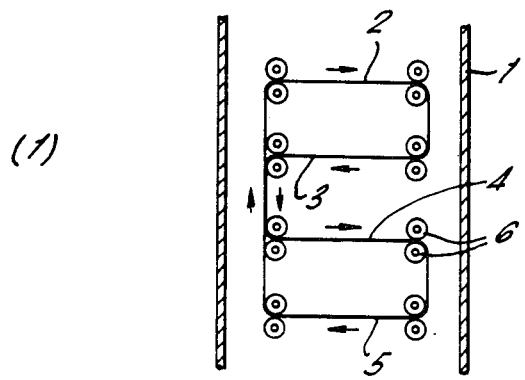
FIG. 1 shows three kinds of displacement of perforated belts.
Figure 1:
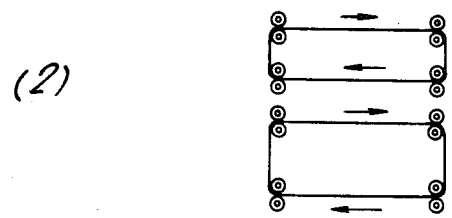
Figure 1:
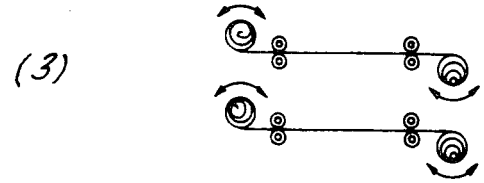

FIG. 1, variant No. 1, shows a vertical cross-sectional view of an arrangement of perforated belt portions. A vertical casing 1 houses a belt which has four horizontal levels 2, 3, 4, 5 on which desorption operations are carried out. The belt portions located at these four levels are connected to one another end-to-end so as to form a single endless belt which is displaced in the direction indicated by arrows in the drawing. The belt is driven along its complicated trajectory by means of pairs of fixed parallel rollers 6 which are rotated in the appropriate direction by a mechanism not shown in the drawings. It will be seen that along its path, the belt is subjected to bending first in one direction and then in the other so that any kind of precipitate which would tend to stick to it is easily and automatically detached from it.

Variant No. 2 in FIG. 1 is an arrangement in which the four horizontal levels at which stripping takes place are provided by two distinct endless perforated belts which permanently move in the same direction and alternatively ascend and descend from one level to the other, and are driven by pairs of rollers similar to the rollers 6.

A third variant shown in FIG. 1 comprises two distinct perforated belts each of which supplies a respective stripping level by alternating movements in either direction. During such movements, the belt is unwound from one drum and extends to another drum on which it is wound and vice versa. Between these two drums, two pairs of horizontal rollers are located through which the said belt passes during its displacement. The belt portion extending between these two pairs of rollers actually constitutes the stripping plate at the level in question. Furthermore this variant is advantageous in that the belt is alternatively bent first in one direction and then in the other, which assists removal of any possible precipitate.

Figure 2:
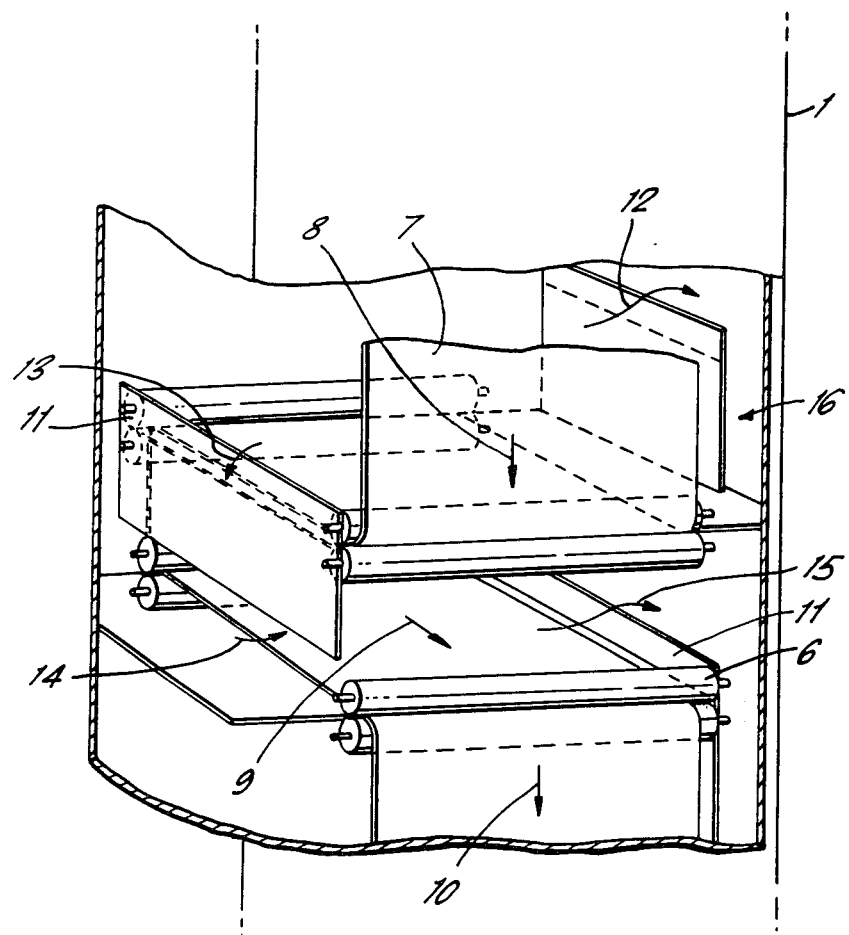
FIG. 2 shows details of a variant of the embodiment of FIG. 1.

FIG. 2 shows, as mentioned above, a detail of the apparatus shown in variant No. 1 of FIG. 1. It will be seen that the vertical casing 1 houses a belt 7, moving in one direction and then in another direction at different levels as indicated by arrows 8, 9, 10.

The liquid to be stripped (waste water from a coke plant) follows a descending path alternatingly extending, each time it passes above a plate (belt portion), from one side to the other of the said plate and vice versa. Liquid flows from any one plate to a lower plate when the liquid reaches a predetermined level above a given plate, the height of this level being controlled by means of a weir 11.

In a very schematic way, the path of the liquid is indicated by arrows 12 to 15 in FIG. 2. The belt 7 is tensioned and driven by means of pairs of rollers 6 disposed in the same way as in variant No. 1 shown in FIG. 1.

FIG. 2 also shows one of the places 16 where sodium hydroxide and/or calcium hydroxide can be injected, and one of the places 17 where the pH of the liquid is measured, preferably continuously.

I claim:

1. In a method of contacting liquid and gaseous phases in a column having a plurality of perforated plates spaced one above another, the improvement comprising the steps of:
   purifying the liquid phase by
   passing the liquid phase downwardly through the column successively over the plurality of plates while
   passing the gaseous phase upwardly through the column;
   withdrawing the gaseous phase from the column and removing any liquid suspended therein;
   subjecting each plate to rotational or translational movement; and
   simultaneously subjecting at least one of the faces of each plate to a cleaning operation.

2. A method as claimed in claim 1, in which liquid in suspension is removed by passing the gaseous phase through a woven stainless steel mat.

3. A method as claimed in claim 1, in which each plate is part of a perforated belt, the plate undergoing translational movement during the cleaning operation.

4. A method as claimed in claim 3, in which all the plates are part of the same perforated belt.

5. A method as claimed in claim 3, in which the perforated belt is endless.

6. A method as claimed in claim 3, in which the perforated belt is of resiliently deformable material.

7. A method as claimed in claim 4, in which, during its displacement, the perforated belt is locally subjected to traction.

8. A method as claimed in claim 1, in which the plates all subjectd to rotational movement about their symmetry axis.

9. A method as claimed in claim 1, in which the movement of the plates is continuous.

10. A method as claimed in claim 1, in which the cleaning operation comprises brushing.

11. A method as claimed in claim 1, further comprising passing waste water from a coke plant and steam through the column in counterflow.

* * * * *